United States Patent [19]

Loomis et al.

[11] Patent Number: 5,171,986
[45] Date of Patent: Dec. 15, 1992

[54] METHODS AND APPARATUS FOR CALIBRATION OF BGO SCINTILLATOR GAMMA RAY ENERGY SPECTRA

[75] Inventors: William A. Loomis; James A. Grau, both of Ridgefield; Jerome A. Truax, Brookfield, all of Conn.

[73] Assignee: Schlumberger Technology Corporation, New York, N.Y.

[21] Appl. No.: 767,177

[22] Filed: Sep. 27, 1991

[51] Int. Cl.$^5$ .................. G01C 25/00; G01V 5/00
[52] U.S. Cl. ................... 250/252.1; 250/256; 250/262; 250/390.07
[58] Field of Search ............... 250/252.1 R, 256, 261, 250/262, 390.07, 390.11

[56] References Cited

U.S. PATENT DOCUMENTS

| | | | |
|---|---|---|---|
| 3,213,279 | 10/1965 | Caldwell | 250/252.1 |
| 3,829,686 | 8/1974 | Schultz et al. | |
| 4,031,367 | 6/1977 | Murphy | |
| 4,433,240 | 2/1984 | Seeman | 250/256 |
| 4,536,841 | 8/1985 | Waechter et al. | 250/390.07 X |
| 4,580,048 | 4/1986 | Dion | 250/256 |
| 4,596,927 | 6/1986 | Hopkinson et al. | 250/262 X |
| 4,760,252 | 7/1988 | Albats et al. | |
| 5,023,449 | 6/1991 | Holenka et al. | 250/252.1 |

OTHER PUBLICATIONS

Response of Bismuth Germanate to Low Energy Neutrons, E. A. Mosson and M. R. Wormald, Nuclear Applications Centre, Harwell Laboratory, OXON OX11, ORA, UK, May 1990.

*Primary Examiner*—Constantine Hannaher
*Assistant Examiner*—Edward J. Glick
*Attorney, Agent, or Firm*—Brumbaugh, Graves, Donohue & Raymond

[57] ABSTRACT

The energy-to-channel response of a bismuth germanate scintillator (BGO) gamma ray spectra measurement system is calibrated by use of the 10.2 MeV gamma ray peak originating from epithermal neutron capture within the BGO crystal as a calibration reference line. The 10.2 MeV peak is located by successively fitting the detected spectrum to the combination of a gaussian-shaped gamma ray peak and an exponentially-shaped background, beginning at the upper end of the spectrum and successively sliding the fitting window downwards until the peak is reached. Once the 10.2 MeV peak has been located, the spectral gain is adjusted to shift the peak to an assigned calibration channel location adjacent the upper end of the overall spectral window.

14 Claims, 3 Drawing Sheets

METHODS AND APPARATUS FOR CALIBRATION OF BGO SCINTILLATOR GAMMA RAY ENERGY SPECTRA

DESCRIPTION

Field of the Invention

The present invention relates to bismuth germanate (BGO) scintillator detector systems for measuring gamma ray energy spectra and, more specifically, to an improved technique for calibrating the energy response of a BGO scintillator spectra measurement system.

BACKGROUND OF THE INVENTION

When gamma ray spectra are obtained from scintillator detectors in logging tools and other devices, it is useful for the spectra to include a standard gamma ray peak or line at a known energy for use in determining the energy calibration and resolution performance of the observed spectra.

One way in which such a reference line has been provided in the past has been to utilize a naturally occurring or neutron-induced gamma ray energy line from the materials in the surrounding environment, i.e., external to the detector device. In U.S. Pat. No. 3,829,686, for example, the gain of a borehole gamma ray energy measuring system is controlled by use of the 2.23 MeV hydrogen line peak in the thermal neutron capture gamma ray energy spectrum resulting from irradiation of the borehole fluid and surrounding earth formations with high energy neutrons. Such external spectra, however, are often so variable that the hydrogen or other elemental spectral lines cannot be reliably located.

The prior art has also attempted to provide a reference line by use of a check source, i.e., a small sample of radioactive material with a fixed known gamma ray energy emission, which is placed close to or attached to the scintillator detector. For example, the use of a $^{65}Zn$ check source for such purpose is disclosed in U.S. Pat. No. 4,031,367. However, since only certain gamma ray energies are conveniently so obtained, and since these gamma rays sometimes interfere with the spectrum to be measured, a check source is not always available or desirable.

SUMMARY

The foregoing and other needs of the prior art are met by the present invention, which provides novel methods and apparatus for calibrating the energy-to-channel response of a BGO scintillator gamma ray energy spectra measuring system by using the 10.2 MeV energy peak resulting from epithermal neutron capture by $^{73}Ge$ in the BGO scintillator crystal as a reference energy line. In a preferred calibration procedure, the gain of the spectra measuring system is initially set low to insure that the portion of the measured spectrum in the vicinity of the 10.2 MeV peak will fall within the available channel range of the pulse height analyzer. A search for the 10.2 MeV peak is then initiated beginning at a channel above the anticipated location of the peak and working downwards until the peak is found. This search is preferably under program control, and, in a preferred embodiment, is carried out by successive fitting to the portion of the measured spectrum in the vicinity of the 10.2 MeV peak combinations of (1) a gaussian-shaped peak which approximates the detector energy resolution at 10.2 MeV and (2) an exponentially-shaped background component. In making the successive fits, a fitting window is successively slid down the spectrum until the best fit criteria determine that a best fit has been achieved. The fitting window is preferably defined by a function which rolls off the window at its upper and lower boundaries to reduce statistical noise in the data.

When the peak has been found and its apparent channel location is determined, the gain of the spectra measuring system is adjusted to shift the 10.2 MeV peak to an assigned calibration channel location to lock in the energy-to-channel response of the system over the entire spectrum. Preferably, therefore, the assigned calibration channel location is adjacent the highest channel available in the pulse height analyzer.

While not so limited, the invention has particular utility in calibrating neutron logging tools which measure gamma ray energy spectra in and around well boreholes. In such a well logging tool, for example, the origination of the 10.2 MeV peak from within the BGO scintillator crystal itself facilitates calibration of the spectra measuring system at the beginning of a logging run.

BRIEF DESCRIPTION OF THE DRAWINGS

For a better understanding of the invention, reference may be made to the following description of an illustrative embodiment thereof and to the accompanying drawings, in which.

DESCRIPTION

For illustrative purposes, the invention is described and illustrated herein by reference to a neutron well logging tool which embodies a BGO scintillator detector and associated digital electronics for generating gamma ray energy spectra. It will be understood, however, that the invention is not limited to well logging applications, but that it has utility in connection with the calibration of BGO scintillator gamma ray energy measurement systems wherever they may be employed.

Figure 1:
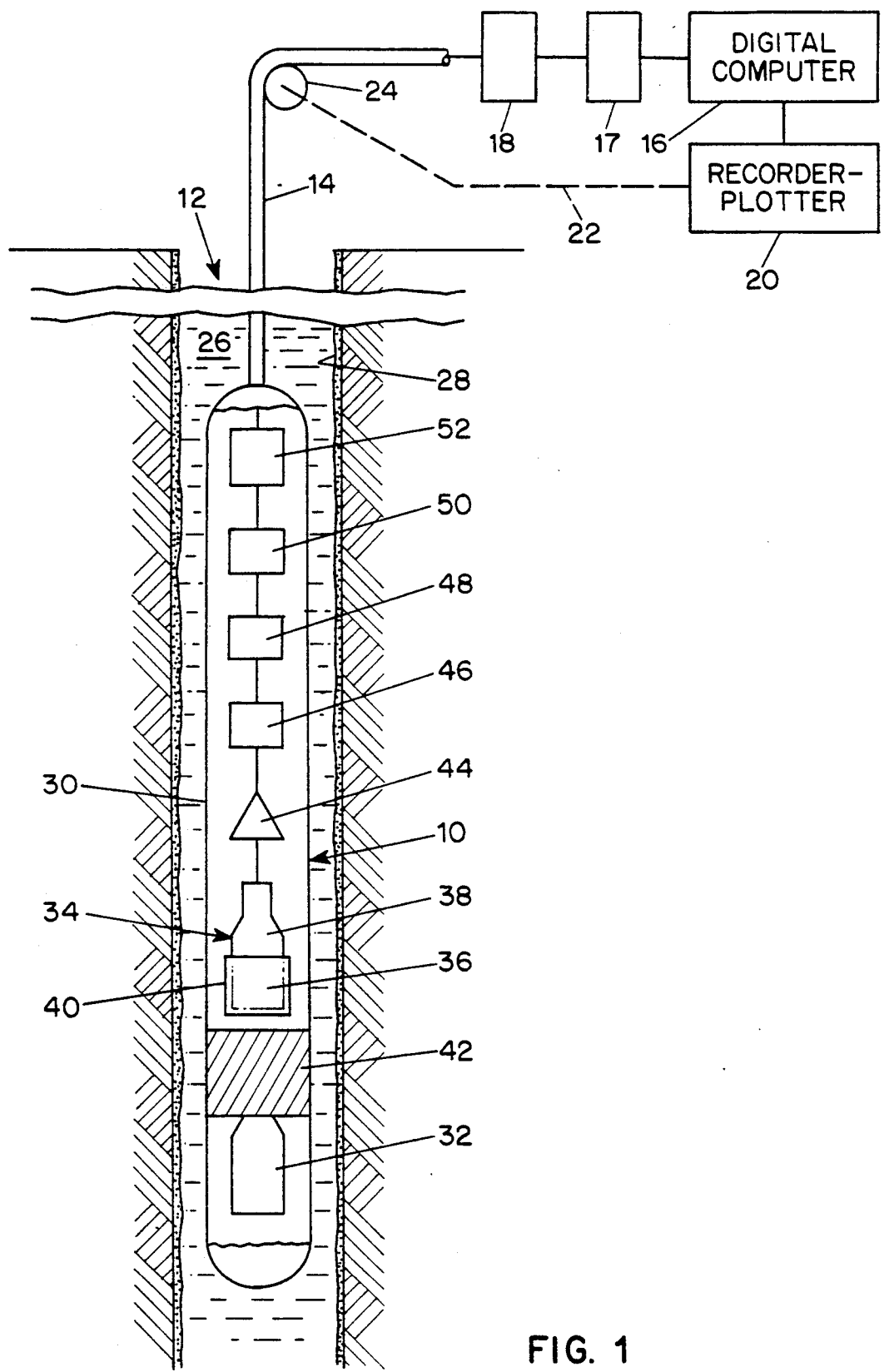
FIG. 1 is a schematic view of a neutron well logging tool to which the invention has particular application.

In FIG. 1, a well logging tool for measuring gamma ray energy spectra includes a downhole sonde 10 suspended in a borehole 12 by an armored cable 14. The cable 14 electrically connects the downhole sonde 10 to a surface equipment package, preferably comprising a truck or skid-mounted digital computer 16, data buffer 17 and other conventional peripherals (not shown), telemetry and cable interface circuits 18, and a recorder-plotter 20 for making the customary visual and/or magnetic record of the measured data vs. depth in the well bore. The recorder-plotter 20 is electrically or mechanically coupled, as indicated schematically by the dashed line 22, to a cable-following sheave wheel 24.

The borehole 12 is illustrated as an open hole, i.e. uncased, containing a fluid 26 and as having a mudcake 28 formed on the wall thereof. Although the logging tool described herein is intended primarily for openhole logging, it may be used in cased holes as well. The sonde 10 includes a pressure and temperature-resistant housing 30 which includes, preferably adjacent the lower end thereof, a high energy neutron source 32. As shown, the source is an encapsulated chemical source, such as AmBe or $^{252}$Cf. Alternatively, a DT or DD-type neutron accelerator could be used as the neutron source.

Spaced along the sonde 10 from the neutron source 32 is a gamma ray detector 34. In accordance with the invention, the detector 34 comprises a BGO scintillator crystal 36 optically coupled to a photomultiplier tube 38. The BGO scintillator is preferably encased within a cooling dewar 40 to insulate it against high borehole temperatures. To reduce direct neutron bombardment of the scintillator crystal 36, high density shielding 42 is preferably interposed between the source 32 and the detector 34.

The output signals from the photomultiplier 38 are first amplified in a preamp 44, and are then shaped and otherwise processed as necessary in circuits 46 for application to an analog-to-digital pulse height analyzer (PHA) 48. The PHA 48 may be of any conventional type, such as a single ramp (Wilkinson rundown) type. It will be understood to include the usual pulse height discriminators, for selection of the gamma ray energy range to be analyzed, and linear gating circuits, for control of the time portion of the detector signal train to be analyzed when a pulsed-neutron source is being used.

The PHA 48 segregates the detector pulses into a multiplicity of channels or energy bins according to their amplitudes and supplies an output signal in digital form representing the amplitude of each analyzed pulse. The counts per channel digital outputs of PHA 48 are accumulated in a buffer memory 50 for a predetermined period of time, e.g., the time required for the sonde 10 to move over the desired depth measurement increment. The memory 50 is then read out to the telemetry and cable interface circuits 52 for transmission of the count data to the surface for receipt by the surface telemetry and cable interface circuits 18.

The spectra (counts per channel) data may be accumulated at the surface in the buffer memory 17 for an additional period if desired, or may otherwise be averaged with data from other depth increments, to reduce statistical uncertainty. Thereafter, the data are transmitted to the computer 16 for on-line processing and are also recorded magnetically as a function of depth by the recorder-plotter 20 for subsequent off-line processing.

Although the spectra data may be processed in various ways to obtain information regarding the hydrocarbon content and other parameters of interest of the surrounding earth formations, one particularly useful technique for performing a constituent analysis of the borehole and earth formations from measured gamma ray energy spectra is disclosed in U.S. Pat. No. 3,521,064 to Moran et al. In accordance with the Moran et al. technique, a detected gamma ray energy spectrum for a formation of unknown composition is compared with a composite spectrum made up of weighted standard spectra of the constituents postulated to comprise the formation. The weight coefficients for the standard spectra which give the best fit of the composite spectrum to the unknown spectrum represent the relative proportions of the constituents in the formation. By appropriate selection of the standard spectra, the proportions of the constituents of interest, such as carbon, oxygen, calcium, silicon, etc., may be obtained, from which the desired information regarding oil content and other parameters may be derived. A further extension of Moran et al. weighted-standard spectra analysis technique is disclosed in U.S. Pat. No. 4,319,993 to Hertzog et al. The disclosures of the Moran et al. and Hertzog et al. patents are hereby incorporated by reference.

Figure 2:
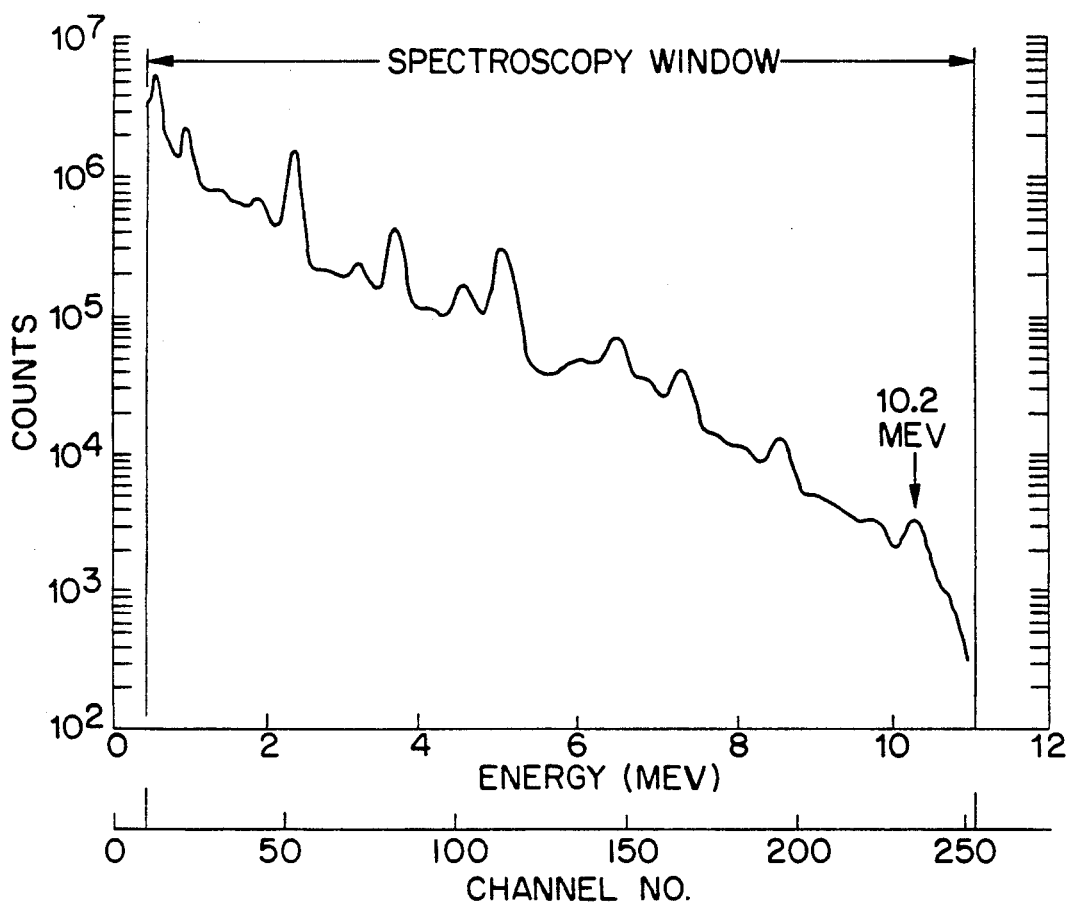
FIG. 2 is a graphical representation of a thermal neutron capture gamma ray energy spectrum taken with a BGO scintillator detector, showing the location of the 10.2 MeV germanium gamma ray peak.

The weighted-standard analysis technique of the Moran et al. and the Hertzog et al. patents requires close calibration of the energy-to-channel response of the spectra measuring system. As a feature of the invention, it is proposed to use as a reference energy line for that purpose the 10.2 MeV peak which has been observed to occur from neutron irradiation of a BGO scintillator crystal. This peak is believed to result from the capture of epithermal neutrons by germanium ($^{73}$Ge) within the scintillator crystal itself, which gives rise to a gamma ray cascade whose total energy is 10.2 MeV. FIG. 2 is a one-hour thermal neutron capture gamma ray spectrum taken in a 15 p.u. clean sand formation using a standard moderated AmBe logging source ($4 \times 10^7$n/s). The 10.2 MeV peak is clearly visible at the upper end of the spectrum.

Use of the 10.2 MeV peak as a reference line to provide energy calibration of the BGO spectra measuring system affords a number of distinct advantages. One, the 10.2 MeV peak originates within the BGO scintillator, and thus, unlike other naturally-occurring or induced gamma ray lines, is immediately available at the start of a logging job. Also, because the 10.2 MeV gamma ray originates within the scintillator, its peak to compton ratio is much better than for any comparable external gamma ray source. The location of the 10.2 Mev peak at the upper end of the spectrum is also advantageous in that thevre are very few counts at energies above the 10.2 Me line. As described more fully hereinafter, this significantly facilitates searching for and accurately locating the peak within the spectrum. A further advantage of the 10.2 MeV peak is that it provides calibration across the full energy spectrum typically of interest, i.e., from 0 to 10 MeV.

A preferred turn-on procedure of the spectra measuring system is to gradually increase the spectral gain so that a significant total count rare is obtained above a suitable energy threshold; for example, gain may be increased until a count rate of several thousands counts/second is obtained above a threshold of approximately 5 to 7 MeV. Alternatively, the gain may be increased until approximately 25% of the total spectrum is above the desired threshold energy, say 5 MeV. This not only assures good count statistics in the spectrum, but also generally positions the 10.2 MeV peak in a known region of channel number. A spectrum may then be obtained, and the 10.2 MeV peak may be searched for in this spectrum, e.g., by digital filter and/or curve-fitting methods. When the peak is found and accurately located, the gain is again adjusted so as to align the 10.2 MeV peak with its assigned calibration channel location within the overall spectral window. Because the 10.2 MeV peak is at the upper end of the typical capture gamma ray energy spectrum (see FIG. 2), the assigned calibration channel location is preferably closely adjacent the upper end of the spectral window or range. This permits maximum use to be made of the full channel capacity of the PHA and affords energy-to-channel calibration across the full spectral window. FIG. 2 illustrates an illustrative location of the 10.2 MeV peak in a 256-channel PHA.

Conveniently, searching for the 10.2 MeV peak is under program control in the computer 16, and may rely on the (at least approximate) gaussian shape of the peak, e.g., with a full-width-half-maximum of approximately 3.3 percent in an actual BGO crystal. As may be seen from FIG. 2, the 10.2 MeV peak sits on an approximately exponential background, and this background may also be accounted for in the shape of the curve fitted to the measured spectrum. For example, given an initial spectrum, and starting from the top of the energy window and working down towards lower energies, a portion of the energy spectrum may be fitted by a combination (e.g., the linear sum) of a gaussian peak and an exponential background with appropriately adjusted gain as described hereinafter. That is, the composite (sum) of the $^{74}$Ge peak (gaussian) and the background (exponential) shapes, appropriately gain adjusted, are successively fit to a region of the upper end of the detected spectrum. This region is defined by successively shifting (in effect shifting the gain of) a fitting window downwards along the spectrum until the peak is located. Gain shifting the window and fitting functions can be calculated without previous knowledge of the actual data and do not require the approximations required to gain shift noisy statistical data.

Figure 3:
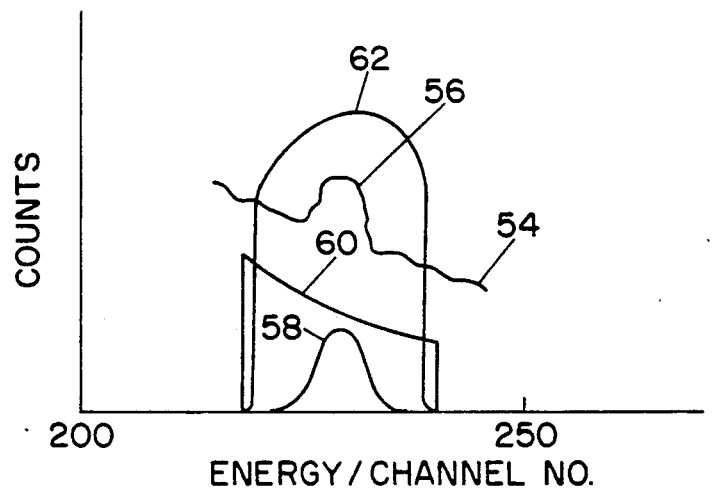
FIG. 3 is a graphical representation of the portion of a detected gamma ray spectrum in the vicinity of the 10.2 MeV peak, and showing superimposed thereon a fitting window, the gaussian shape of the 10.2 MeV gamma ray peak component and the exponential shape of the background component of the detected spectrum.

FIG. 3 illustrates the portion 54 of the gamma ray energy spectrum near the 10.2 MeV peak 56. To a good approximation, the measured spectra peak 56 may be assumed to be the sum of the gaussian-shaped $^{74}$Ge gamma ray curve 58 and the exponentially-shaped background curve 60. A relatively narrow fitting window 62 is located so as to span the region of the detected peak 56. The window is defined by the function 62 and acts as a weighting function to define the portion of spectrum to be fit by the gaussian peak shape function 58 and the exponential background 60. The window function 62 is non-zero in only a limited region and goes to zero smoothly at each side so as to reduce noise effects as the window slides down the spectrum during the peak search.

The quality of the fit between data values and fitted values may be determined by any suitable measure, e.g., chi-square, sum of absolute differences, or largest absolute difference. For the chi-square minimization technique, the fitting problem is to minimize the chi-square function which is defined as:

$$X^2 = [\tilde{D} - S\tilde{a}]^T W [\tilde{D} - S\tilde{a}] \tag{1}$$

where
  $X^2$ is the chi-square value;
  D is a column vector containing values of the measured spectrum;
  S is a matrix of two columns whose columns are the respective gain-shifted shapes of the $^{74}$Ge peak and the exponential background;
  $[\tilde{D} - S\tilde{a}]^T$ is the row vector that is transposed from the column vector $[\tilde{D} - S\tilde{a}]$;

$\tilde{a}$ is a two element column vector whose elements are the respective coefficients of the $^{74}$Ge peak and the exponential background; and W is a square diagonal matrix whose diagonal coefficients are values taken from the window function 62, appropriately gain shifted. The rank of W, i.e., its size, (and also the corresponding lengths of vector D and matrix S) is defined by the number of channels over which the gain-shifted shape of the fitting window is non-zero.

The value of $\tilde{a}$ which minimizes $X^2$ is found for each decrease of gain in the search procedure. The value of $\tilde{a}$ which minimizes the chi-square is given by:

$$\tilde{a} = (S^T W S)^{-1} S^T W \tilde{D} \tag{2}$$

or $$\tilde{a} = V\tilde{D}, \quad V = (S^T W S)^{-1} S^T W \tag{3}$$

V is a matrix of two rows which does not depend on the measured spectrum as expressed in $\tilde{D}$. To speed up and economize calculation, V does not have to be calculated for each successive gain shifted value of S and W, rather V is calculated once and its two rows are correspondingly gain shifted at each step.

The procedure for forming the gain shifted matrices S and W from the Gaussian peak, exponential background and window shapes is as follows. Let I(E) be the shape of the measured spectrum when its gain is ideally adjusted, with E being energy and $E_{102}$ being the centroid of the $^{74}$Ge peak. Peak function P(E) and background function B(E) are respectively a gaussian function of amplitude and width and a simple exponential so that to good accuracy:

$$I(E) = P(E) + (B(E) \tag{4}$$

in the region of several channels around $E_{102}$. At worst, such functions may be obtained by trial and error with knowledge of I(E).

The window function $F_w(E)$ is a smooth function of E, which is proportional to the mean square statistical fluctuations in a sample of actual count data whose shape approximates B(E):

$$F_w(E) = 1/B(E) \tag{5}$$

close to $E_{102}$. Since we are only interested in the region near $E_{102}$, we make $F_w(E)$ go smoothly to zero for values of E where $|E - E_{102}|$ is larger than several times the full-width-half-max of the peak function P(E). The exact shape of $F_w(E)$ is not critical, and it may be determined by trial and error also. P(E), B(E) and $F_w(E)$ reflect prior knowledge of optimal behavior of the gamma ray spectrometer.

In the search procedure, $\tilde{a}$ is calculated for each step in decreasing gain g, (g < 1). The gain shifted functions are only needed in a limited number of channels about the gain shifted $^{74}$Ge peak position, $g^*E_{102}$ (rounded off to the actual energy value of the nearest channel). This is the set of channels:

$$\{k\} = (k, k_2, \ldots, g^*E_{102}, \ldots, K_m)$$

about $g^*E_{102}$. For the set of channels $\{k\}$, the gain shifted window function is $1/g \times F_w(\{k/g\})$. The set $\{k\}$ needs only to be large enough so that the gain shifted window function $1/g \times F_w(\{k/g\})$ is not zero for the set of values $\{k/g\}$. The set $\{k\}$ is then used to define the matrices used in the chi-square minimization at the gain g:

$$S = 1/g \times \begin{bmatrix} P(k_1/g) & B(k_1/g) \\ \cdot & \cdot \\ \cdot & \cdot \\ P(k_n/g) & B(k_n/g) \end{bmatrix}$$

$$W = 1/g \times \begin{bmatrix} F_w(k_n/g) & & O \\ & \cdot & \\ O & & f_w(k_n/g) \end{bmatrix}$$

$$\tilde{a} = \begin{bmatrix} a(1) \\ a(2) \end{bmatrix} \quad \tilde{D} = \begin{bmatrix} D(k_1) \\ \cdot \\ \cdot \\ D(g \times E_{102}) \\ \cdot \\ D(k_n) \end{bmatrix}$$

V is similarly calculated.

Figure 4:
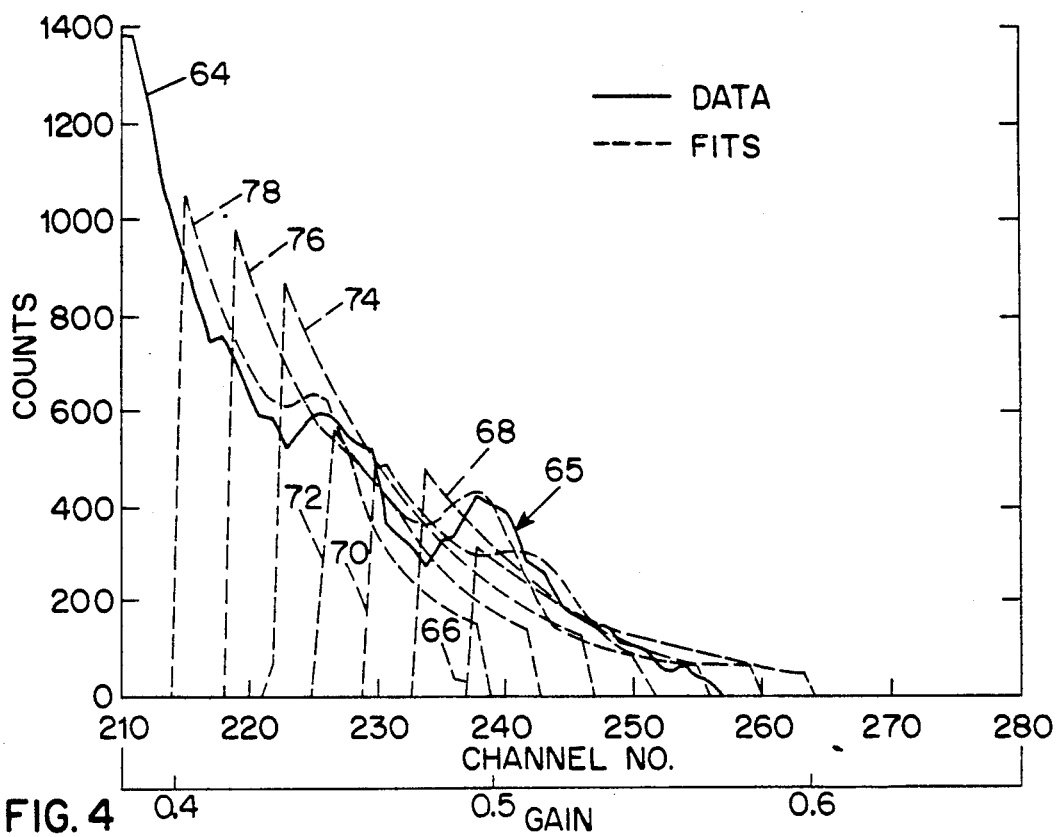
FIG. 4 is a graphical representation of the upper end of a detected spectrum, and showing superimposed thereon successive fits to the 10.2 MeV peak.
Figure 5:
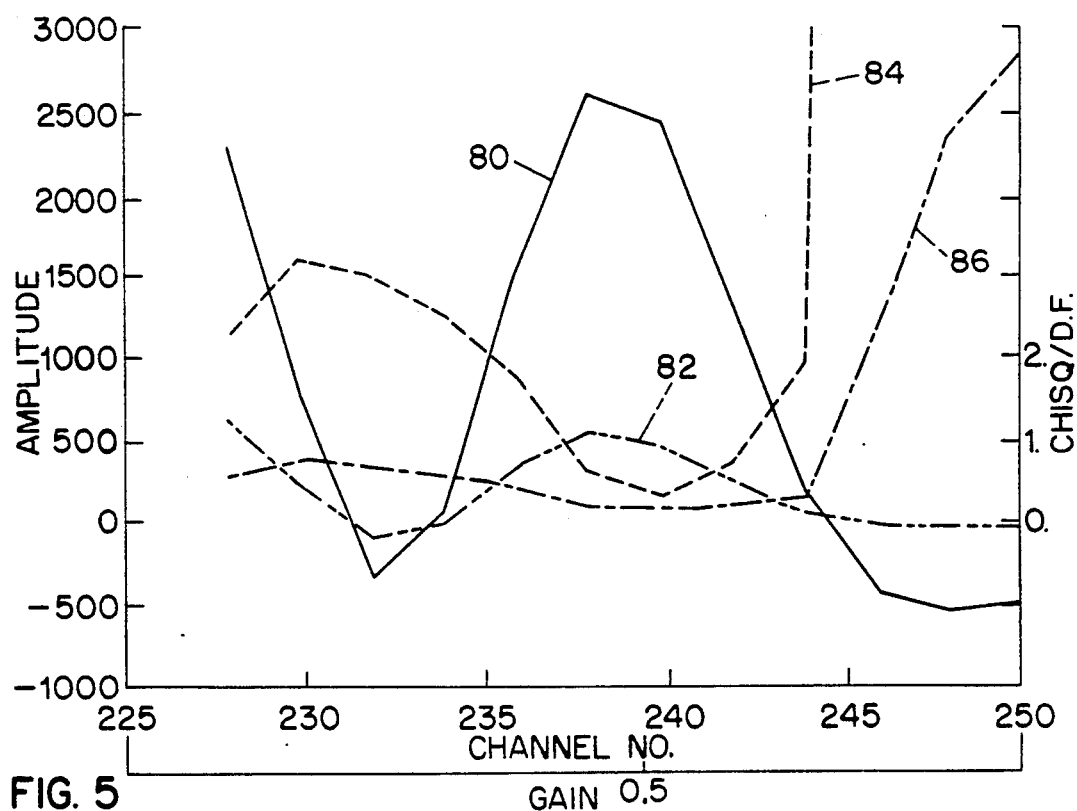
FIG. 5 is a graphical representation of peak amplitude vs. channel number and chi-square/degree of freedom vs. channel number for best fits to two different spectral data sets.

In the experimental implementation illustrated by FIGS. 4 and 5, the foregoing chi-square technique was used successfully. FIG. 4 specifically shows BGO-detected spectral data represented by a solid line 64 and seven successive best fits to the region adjacent to the 10.2 MeV peak 65 represented by broken lines 66 through 78. The spectrum 64 was obtained from a 5 minute exposure in a 15 p.u. sand formation using the aforementioned standard AmBe source. It may readily be appreciated that curve 72 provides a superior fit to peak 65 as compared with respective curves 66–70 and 74–78. Thus, the channel location of the 10.2 MeV peak corresponds to a close approximation to that for the gaussian fitting peak of curve 72.

For the fit represented by curve 72 of FIG. 4, as well as for a corresponding fit based on 1 minute data, FIG. 5 shows the amplitude $a(1)$ of the peak function and the value of the minimum chi-square for a search sequence of gains. In this case, the gain g is represented by the channel number corresponding to $g^*E_{102}$ as defined above. The 5 minute data peak amplitude is represented by solid line 80, the 1 minute data peak amplitude by dotted line 82, the 5 minute chi-square values by broken line 84, and the 1 minute chi-square values by chain-dotted line 86. It is readily apparent that the gaussian peak amplitude is highest at the data peak, and that the chi-square values are lowest there. The 10.2 MeV peak was reliably located by both 5 minute and 1 minute data to two channels out of 237, or approximately 0.8 percent. This is quite adequate to locate the 10.2 MeV peak with sufficient accuracy to lock in the energy-to-channel response gain of the spectra measuring system for purposes of the weighted-standards fitting technique of the aforementioned Moran et al. and Hertzog et al. patents.

Once the channel location of the 10.2 MeV peak is determined, the energy gain of the detector-analyzer system is adjusted, e.g., by adjustment of the high voltage power supply to the photomultiplier tube 38, to shift the peak to its assigned calibration channel location adjacent the upper end of the energy range of interest. (See FIG. 2) Thereafter, should the energy-to-channel response of the detector-analyzer system vary, as often occurs during a logging run due to fluctuation in borehole temperatures, the foregoing search and fitting procedure may be repeated to relocate the peak and restore it to its calibration channel location, or such active gain control may be accomplished using conventional techniques. Regardless of the specific form of active gain control used, the present invention affords a reliable technique for finding the 10.2 MeV peak and for accurately determining its channel location to initially lock in the energy-to-channel response of the entire gamma ray spectrum.

Although the invention has been described and illustrated herein with reference to a specific embodiment thereof, it will be understood by those skilled in the art that such embodiment is susceptible of variation and modification without departing from the inventive concepts disclosed. All such variations and modifications, therefore, are intended to be included within the spirit and scope of the appended claims.

We claim:

1. A method for calibrating the energy-to-channel response of a gamma ray energy spectrum measurement system including a bismuth germanate (BGO) gamma ray detector for generating electrical pulses having amplitudes representative of the energies of the gamma rays incident thereon and a pulse height analyzer for sorting the detector pulses into a plurality of channels according to the energies of the corresponding gamma rays to thereby produce an energy spectrum of the gamma rays detected by said detector, comprising:

emitting high-energy neutrons in the vicinity of the BGO detector;

measuring the energy spectrum of gamma rays detected by the BGO detector as a result of said neutron emission;

determining an apparent channel location in said spectrum of the 10.2 MeV energy peak produced by epithermal neutron capture in said BGO detector; and adjusting the gain of said gamma ray energy spectrum measurement system to shift the location of said 10.2 MeV energy peak to an assigned calibration channel location for said peak.

2. The method of claim 1, wherein:

said measured energy spectrum spans substantially all of the available channels of said pulse height analyzer; and said assigned calibration channel location for said 10.2 MeV energy peak is adjacent the highest of said available channels.

3. The method of claim 1 wherein the apparent location of said 10.2 Mev energy peak is determined by:

initially setting the gain of said system low to insure that said 10.2 Mev energy peak falls within the available channels of said pulse height analyzer; and searching for the location of said 10.2 MeV energy peak by beginning at a channel above the spectrum and working downwards therefrom.

4. The method of claim 3 wherein the step of searching for said 10.2 MeV peak comprises:

successively fitting the portion of the measured energy spectrum in the vicinity of the 10.2 MeV energy peak to the combination of (1) a substantially gaussian-shaped peak component and (2) a substantially exponentially-shaped background component; and determining which of said successive fits provides the best fit to said portion of the measured energy spectrum.

5. The method of claim 4 wherein said successive fits are made by:

successively applying a fitting window to said portion of the measured spectrum; and successively sliding said fitting window downwards in said spectrum between fits.

6. The method of claim 4 wherein said fitting window is defined by a function which rolls off the fitting window at the upper and lower boundaries thereof.

7. The method of claim 1 wherein:

said BGO gamma ray detector and said pulse height analyzer are enclosed within a well logging sonde adapted to be moved through a well borehole; and said high-energy neutrons are emitted by a neutron source carried by said well logging sonde.

8. The method of claim 7 wherein the apparent channel location of said 10.2 MeV peak is determined and the gain of said gamma ray energy spectrum measurement system is adjusted to shift the location of said peak to said assigned calibration channel location before beginning a logging run with said well logging sonde.

9. In a well logging tool for measuring gamma ray energy spectra of materials in and around a well borehole, including a source of high energy neutrons for irradiating said materials, a bismuth germanate (BGO) gamma ray detector for generating electrical pulses having amplitudes representative of the energies of the gamma rays incident thereon, a pulse height analyzer for sorting the detector pulses into a plurality of channels according to the energies of the corresponding gamma rays, and means for producing from the pulse height analyzer outputs an energy spectrum of the gamma rays detected by said detector, the improvement comprising:

means for determining an apparent channel location in said gamma ray energy spectrum of the 10.2 MeV energy peak produced by epithermal neutron capture in said BGO detector; and means for adjusting the gain of said gamma ray energy spectrum measurement system to shift the location of said 10.2 MeV energy peak to an assigned calibration channel location for said peak.

10. The logging tool of claim 9, wherein:

said measured energy spectrum spans substantially all of the available channels of said pulse height analyzer; and said assigned calibration channel location for said 10.2 MeV energy peak is adjacent the highest of said available channels.

11. The logging tool of claim 9 wherein said apparent location determining means includes:

means for initially setting the gain of said system low to insure that said 10.2 MeV energy peak falls within the available channels of said pulse height analyzer; and means for searching for the location of said 10.2 MeV energy peak by beginning at a channel above the spectrum and working downwards therefrom.

12. The logging tool of claim 11 wherein said peak searching means comprises:

means for successively fitting the portion of the measured energy spectrum in the vicinity of the 10.2 MeV energy peak to the combination of (1) a substantially gaussian-shaped peak component and (2) a substantially exponentially-shaped background component; and means for determining which of said successive fits provides the best fit to said portion of the measured energy spectrum.

13. The logging tool of claim 12 wherein said fitting means includes:

means for successively applying a fitting window to said portion of the measured spectrum; and means for successively sliding said fitting window downwards in said spectrum between fits.

14. The logging tool of claim 13 wherein said fitting window is defined by a function which rolls off the fitting window at the upper and lower boundaries thereof.

* * * * *

UNITED STATES PATENT AND TRADEMARK OFFICE
CERTIFICATE OF CORRECTION

PATENT NO. : 5,171,986
DATED : December 15, 1992
INVENTOR(S) : Loomis et al.

It is certified that error appears in the above-identified patent and that said Letters Patent is hereby corrected as shown below:

Col. 5, line 62, "D" should read $--\bar{D}--$;
Col. 6, line 62, "$K_m$" should read $--k_n--$;
Col. 7, line 17, "$f_w$" should read $--F_w--$.

Signed and Sealed this

Ninth Day of November, 1993

Attest:

BRUCE LEHMAN

Attesting Officer

Commissioner of Patents and Trademarks